United States Patent
Tzannes et al.

(10) Patent No.: US 6,252,909 B1
(45) Date of Patent: Jun. 26, 2001

(54) MULTI-CARRIER TRANSMISSION SYSTEM UTILIZING CHANNELS OF DIFFERENT BANDWIDTH

(75) Inventors: Michael A. Tzannes, Newton; Peter Niels Heller, Somerville; John P. Stautner, Waltham, all of MA (US); William R. Morrell, Seattle, WA (US); Sriram Jayasimha, Wellesley, MA (US)

(73) Assignee: Aware, Inc., Bedford, MA (US)

( * ) Notice: Subject to any disclaimer, the term of this patent is extended or adjusted under 35 U.S.C. 154(b) by 0 days.

(21) Appl. No.: 08/804,909

(22) Filed: Feb. 25, 1997

Related U.S. Application Data

(60) Continuation-in-part of application No. 08/307,331, filed on Sep. 16, 1994, now Pat. No. 5,606,642, which is a division of application No. 07/948,147, filed on Sep. 12, 1992, now Pat. No. 5,408,580.

(51) Int. Cl.[7] .............................. H04K 1/10; H04B 1/38; H03D 1/24
(52) U.S. Cl. ......................... 375/260; 375/219; 329/357
(58) Field of Search .................................... 375/260, 259, 375/261, 355, 347, 231, 222, 295, 221, 316, 270, 219; 370/480, 367; 329/357; 704/201, 220, 500, 503

(56) References Cited

U.S. PATENT DOCUMENTS

| | | | |
|---|---|---|---|
| 5,048,054 | * 9/1991 | Eyuboglu et al. | 375/222 |
| 5,170,413 | * 12/1992 | Hess et al. | 375/260 |
| 5,243,629 | * 9/1993 | Wei | 275/299 |
| 5,285,474 | * 2/1994 | Chow et al. | 375/231 |
| 5,479,447 | * 12/1995 | Chow et al. | 375/260 |

\* cited by examiner

*Primary Examiner*—Chi H. Pham
*Assistant Examiner*—Khai Tran
(74) *Attorney, Agent, or Firm*—Testa, Hurwitz & Thibeault, LLP

(57) ABSTRACT

A communication system for sending a sequence of symbols on a communication link. The system includes a transmitter for placing information indicative of the sequence of symbols on the communication link and a receiver for receiving the information placed on the communication link by the transmitter. The transmitter includes a clock for defining successive frames, each of the frames including M time intervals, where M is an integer greater than 1. A modulator modulates each of M carrier signals with a signal related to the value of one of the symbols thereby generating a modulated carrier signal corresponding to each of the carrier signals. The modulated carriers are combined into a sum signal which is transmitted on the communication link. The carrier signals include first and second carriers, the first carrier having a different bandwidth than the second carrier. In one embodiment, the modulator includes a tree-structured array of filter banks having M leaf nodes, each of the values related to the symbols forming an input to a corresponding one of the leaf nodes. Each of the nodes includes one of the filter banks. Similarly, the receiver can be constructed of a tree-structured array of sub-band filter banks for converting M time-domain samples received on the communication link to M symbol values.

4 Claims, 5 Drawing Sheets

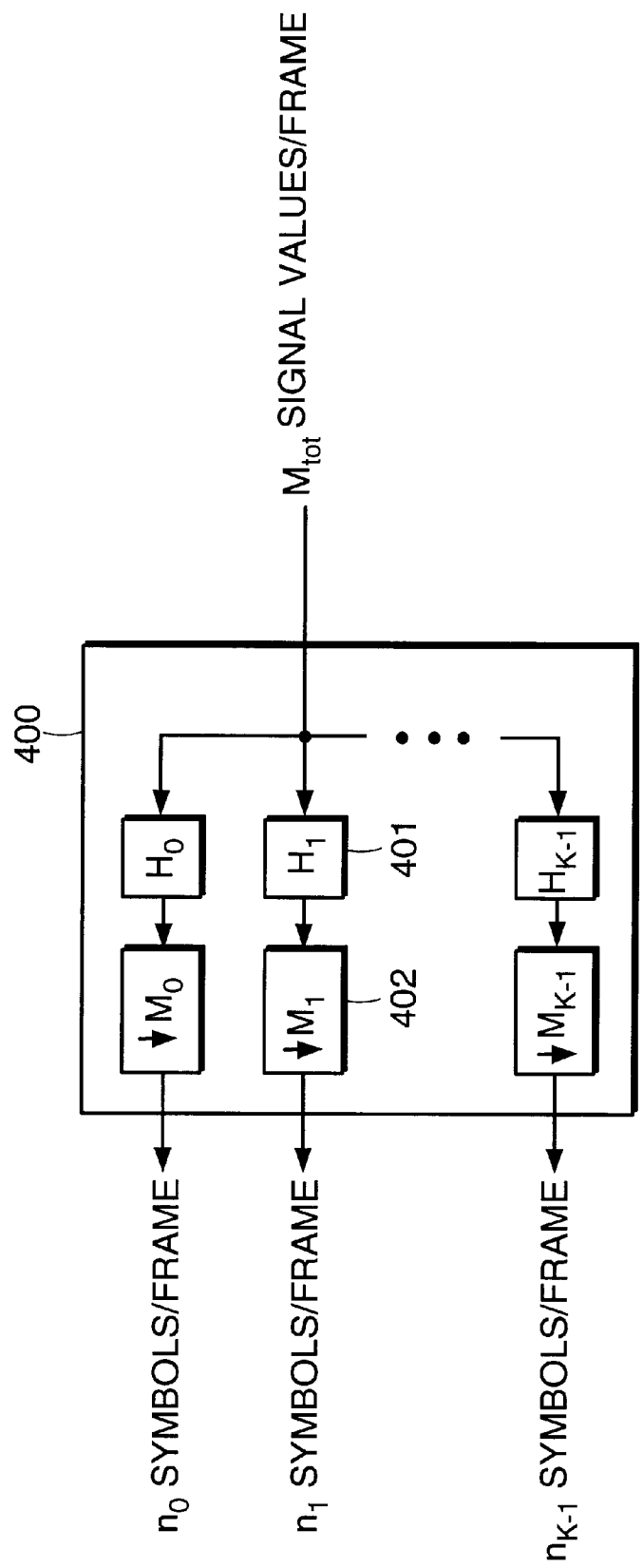

MULTI-CARRIER TRANSMISSION SYSTEM UTILIZING CHANNELS OF DIFFERENT BANDWIDTH

This application is a Continuation-in-Part of U.S. patent application Ser. No. 08/307,331, filed Sep. 16, 1994, Pat. No. 5,606,642, which is a division of U.S. Patent Application Ser. No. 07/948,147, filed Sep. 21, 1992, Pat. No. 5,408,580.

FIELD OF THE INVENTION

The present invention relates to data transmission systems, and more particularly, to an improved multi-carrier transmission system.

BACKGROUND OF THE INVENTION

In prior art multi-carrier systems, a communication path having a fixed bandwidth is divided into a number of sub-bands having different frequencies. The width of the sub-bands is chosen to be the same for all sub-bands and small enough to allow the distortion in each sub-band to be modeled by a single attenuation and phase shift for the band. If the noise level in each band is known, the volume of data sent in each band may be maximized for any given bit error rate by choosing a symbol set for each channel having the maximum number of symbols consistent with the available signal-to-noise ratio of the channel. By using each sub-band at its maximum capacity, the amount of data that can be transmitted in the communication path for a given error rate is maximized.

For example, consider a system in which one of the sub-channels has a signal-to-noise ratio which allows at least 16 digital levels to be distinguished from one another with an acceptable error rate. In this case, a symbol set having 16 possible signal values is chosen. If the incoming data stream is binary, each consecutive group of 4 bits is used to compute the corresponding symbol value which is then sent on the communication channel in the sub-band in question.

In digitally implemented multi-carrier systems, the actual synthesis of the signal representing the sum of the various modulated carriers is carried out via a mathematical transformation that generates a sequence of numbers that represents the amplitude of the signal as function of time. For example, a sum signal may be generated by applying an inverse Fourier transformation to a data vector generated from the symbols to be transmitted in the next time interval. Similarly, the symbols are recovered at the receiver using the corresponding inverse transformation.

The computational workload inherent in synthesizing and analyzing the multi-carrier signal is related to the number of sub-bands. For example, if Fourier transforms are utilized, the workload is of order NlogN where N is the number of sub-bands. Similar relationships exist for other transforms. Hence, it is advantageous to minimize the number of sub-bands.

There are two factors that determine the number of sub-bands in prior art systems. First, the prior art systems utilize a uniform bandwidth. Hence, the number of sub-bands is at least as great as the total bandwidth available for transmission divided by the bandwidth of the smallest sub-band. The size of the smallest sub-band is determined by need to characterize each channel by a single attenuation and phase shift. Thus, the sub-band having the most rapidly varying distortion sets the number of sub-bands and the computational workload in the case in which white noise is the primary contributor to the signal-to-noise ratio.

In systems in which the major source of interference is narrow band interference, the minimum sub-band is set with reference to the narrowest sub-band that must be removed from the communication channel to avoid the interference. Consider a communication channel consisting of a twisted pair of wires which is operated at a total communication band which overlaps with the AM broadcast band in frequency. Because of the imperfect shielding of the wires, interference from strong radio stations will be picked up by the twisted pair. Hence, the sub-bands that correspond to these radio signals are not usable. In this case, prior art systems break the communication band into a series of uniform sub-bands in which certain sub-bands are not used. Ideally, the sub-bands are sufficiently narrow that only the portion of the spectrum that is blocked by a radio signal is lost when a sub-band is marked as being unusable.

Broadly, it is the object of the present invention to provide an improved multi-carrier transmission system.

It is a further object of the present invention to provide a multi-carrier transmission system having a lower computational workload than imposed by systems having bands of equal band-width.

These and other objects of the present invention will become apparent to those skilled in the art from the following detailed description of the invention and the accompanying drawings.

SUMMARY OF THE INVENTION

The present invention is a communication system for sending a sequence of symbols on a communication link. The system includes a transmitter for placing information indicative of the sequence of symbols on the communication link and a receiver for receiving the information placed on the communication link by the transmitter. The transmitter includes a clock for defining successive frames, each of the frames including M time intervals, where M is an integer greater than 1. A modulator modulates each of the M carrier signals with a signal related to the value of one of the symbols thereby generating a modulated carrier signal corresponding to each of the carrier signals. The modulated carriers are combined into a sum signal which is transmitted on the communication link. The carrier signals include first and second carriers, the first carrier having a different bandwidth than the second carrier. In one embodiment, the modulator includes a tree-structured array of filter banks having M leaf nodes, each of the values related to the symbols forming an input to a corresponding one of the leaf nodes. Each of the nodes includes one of the filter banks. Similarly, the receiver can be constructed of a tree-structured array of sub-band filter banks for converting M time-domain samples received on the communication link to M symbol values.

BRIEF DESCRIPTION OF THE DRAWINGS

FIG. 5 is a schematic view of a second embodiment of an analysis filter bank that may be used with the present invention to generate a time-domain to frequency-domain transformation.

DETAILED DESCRIPTION OF THE INVENTION

Figure 1:
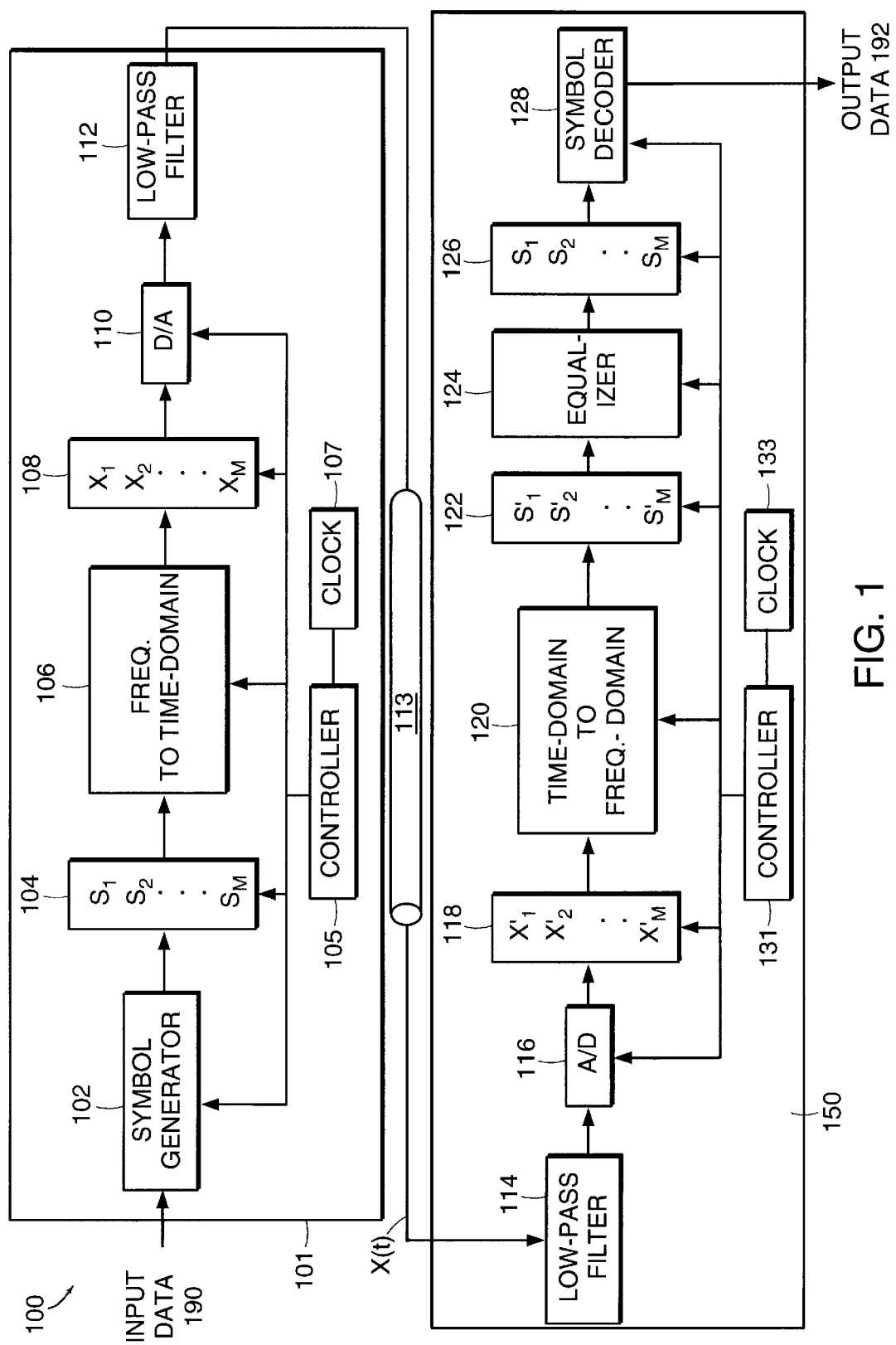
FIG. 1 is a block diagram of a typical prior art multicarrier transceiver.

The manner in which the present invention operates can be more easily understood with reference to FIG. 1 which is a block diagram of a typical prior art multi-carrier transceiver 100. Transceiver 100 transmits data on a communication link 113. The input data stream is received by a symbol generator 102 which converts a run of data bits from the input stream into M symbols $S_1, S_2, \ldots, S_M$ which are stored in a register 104. The number of possible states for each symbol will depend on the noise levels in the corresponding frequency band on the transmission channel 113 and on the error rate that can be tolerated by the data. For the purposes of the present discussion, it is sufficient to note that each symbol is a number whose absolute value may vary from 0 to some predetermined upper bound. For example, if a symbol has 16 possible values, this symbol can be used to represent 4 bits in the input data stream.

Transceiver 100 treats the symbols $S_i$ as if they were the amplitude of a signal in a narrow frequency band. Frequency to time-domain transform circuit 106 generates a time-domain signal $X_i$, for i from 0 to M−1, that has the frequency components $S_i$. The time-domain signals are stored in a shift register 108. The contents of shift register 108 represent, in digital form, the next segment of the signal that is to be actually transmitted over communication link 113. The actual transmission is accomplished by clocking the digital values onto transmission link 113 (possibly after upconversion to radio frequencies) after converting the values to analog voltages using D/A converter 110. Clock 107 provides the timing pulses for the operation. The output of D/A converter 110 is low-pass filtered by filter 112 before being placed on communication link 113.

At the receiving end of transmission link 113, the transmission segment is recovered. The signals received on communication link 113 are low-pass filtered to reduce the effects of high frequency noise transients. The signals are then digitized and shifted into a register 118. When M values have been shifted into register 118, the contents thereof are converted via a time-domain to frequency-domain transform circuit 120 to generate a set of frequency-domain symbols $S'_i$. This transformation is the inverse of the transformation generated by frequency to time-domain transform 106. It should be noted that communication link 113 will, in general, both attenuate and phase shift the signal represented by the $X_i$. Hence, the signal values received at low-pass filter 114 and A/D converter 116 will differ from the original signal values. Thus, the contents of shift register 118 will not match the corresponding values from shift register 108. For this reason, the contents of shift register 118 are denoted by $X'_i$. Similarly, the output of the time to frequency-domain transform will also differ from the original symbols $S_i$; hence, the contents of register 122 are denoted by $S'_i$. Equalizer 124 corrects the $S'_i$ for the attenuation and phase shift resulting from transmission over communication link 113 to recover the original symbols which are stored in buffer 126. In addition, equalizer 124 corrects the symbols for intersymbol interference arising from synchronization errors between the transmitter and receiver. Finally, the contents of buffer 126 are decoded to regenerate the original data stream by symbol decoder 128.

For efficient design of the equalizer 124 in FIG. 1, each subchannel must be sufficiently narrow to allow the distortions in that subchannel to be modeled by a single phase shift and attenuation. Sub-channels must also be sufficiently narrow to assure that a sub-channel that is turned off to prevent interference from narrow band sources does not unduly waste bandwith beyond that corrupted by the interference source. However, using narrower channels across the transmission band increases both system latency and the computational complexity of the frequency-domain-to-time-domain transformation and its inverse. The present invention is based on the observation that the variation in the attenuation and phase shift as a function of frequency is greater at low frequencies than at higher frequencies for communication links consisting of twisted pairs or coaxial cable. Thus, it is advantageous from a computational complexity viewpoint to employ narrower subchannels at the low frequencies and wider subchannels at the higher frequencies in a multicarrier modulation system.

To implement a variable channel width system, a transformation that breaks the available frequency band into sub-bands of differing width is required. Such a transformation may be constructed from a tree configured filter bank. Tree configured filters are known in the audio compression arts. For example, U.S. Pat. No. 5,408,580, which is hereby incorporated by reference, describes the analysis of an audio signal into frequency components representing the audio signal in different frequency bands utilizing such a filter. The frequency bands vary in width such that the lower frequency bands are divided into smaller bands than the higher frequency bands.

Figure 2:
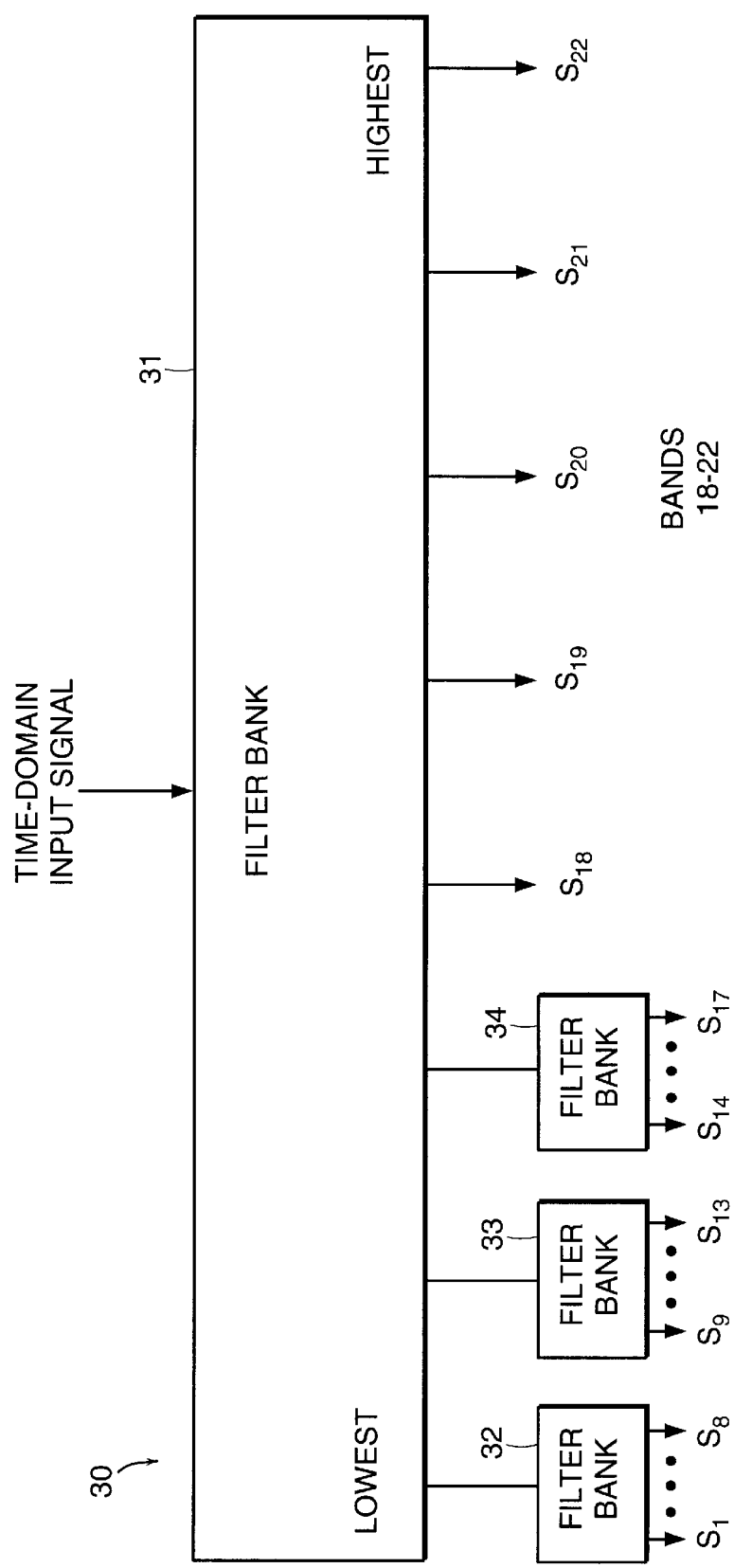
FIG. 2 is a block diagram of a filter bank for performing the time-domain to frequency-domain transformation utilized by the present invention.

Refer now to FIG. 2 which illustrates the decomposition of a signal into frequency sub-bands by a tree structured filter 30. Such a filter could be utilized to implement the time-domain to frequency-domain transformation 120 shown in FIG. 1. Filter 30 includes two levels of filter banks. The manner in which the filter banks are constructed will be discussed in more detail below. In the example shown in FIG. 2, 22 sub-bands are utilized. The decomposition is carried out in two levels of filters. The first level of filter 30 consists of a filter bank 31 which divides the input signal into eight sub-bands of equal size. The second level subdivides the lowest three frequency bands from filter bank 31 into finer subdivisions. The second level consists of three filter banks 32–34. Filter bank 32 divides the lowest sub-band from filter bank 31 into 8 equal sub-bands. Filter bank 33 and filter bank 34 divide the second and third sub-bands created by filter bank 31 into five and four sub-bands respectively. The combination of the two levels generates 22 frequency sub-bands. When applying the tree-structured filter bank to multicarrier communications, the analysis filter bank is used to demodulate the received signal. The filter bank performs a time-domain to frequency-domain transformation, converting received signal amplitudes into demodulated symbols for subsequent equalization.

Figure 3:
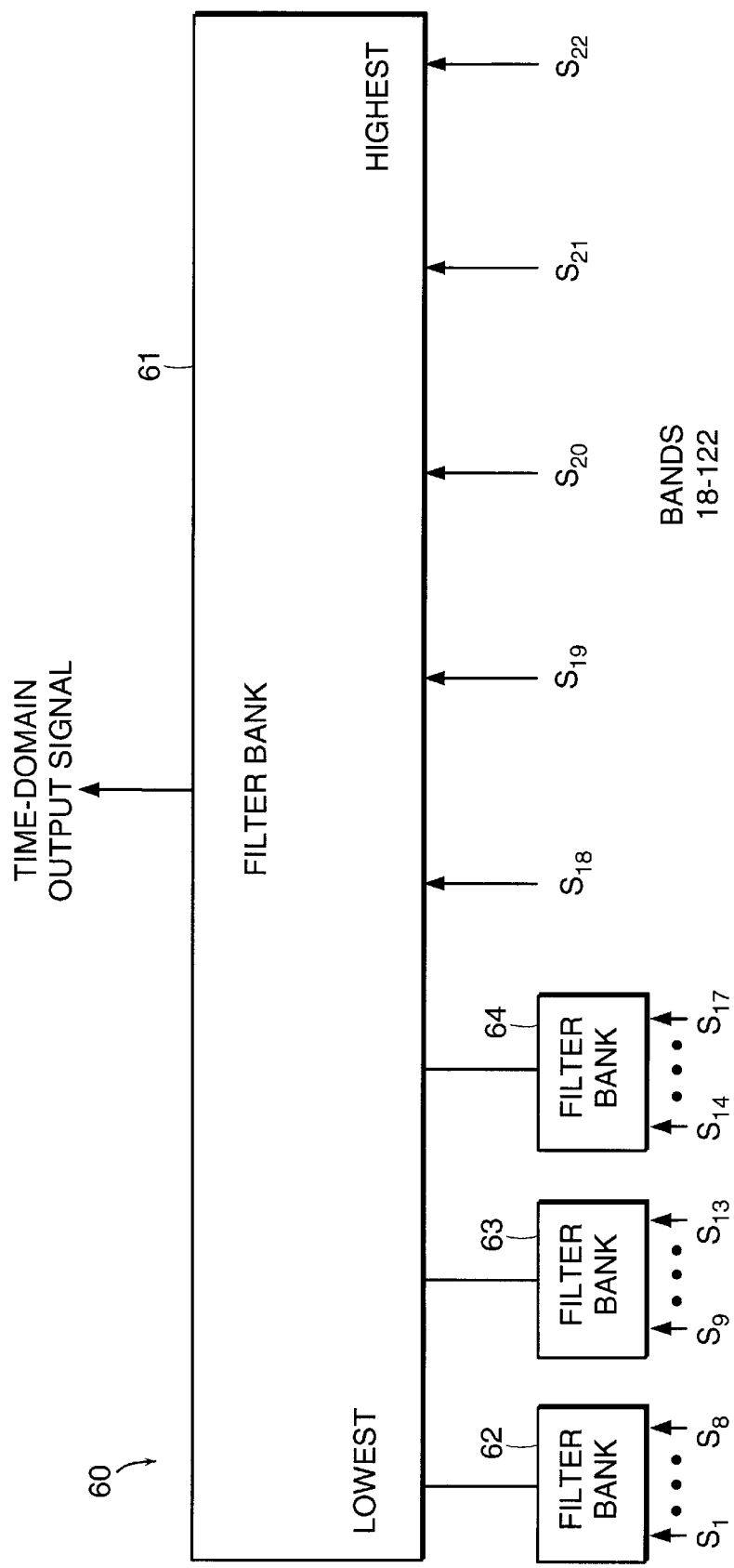
FIG. 3 is a block diagram of a filter bank for performing the frequency-domain to time-domain transformation utilized by the present invention.

The reverse transformation can performed by an analogous filter bank such as shown in FIG. 3 at 60. Filter 60 provides the frequency-domain to time-domain transformation shown in FIG. 1. The reverse transformation also utilizes a two level tree structure. The symbols to be sent on the finer sub-bands are first combined using a first set of synthesis filters shown at 62–64 to provide signals representing three larger sub-bands of the same width as bands 18–22. These "symbols" together with those from bands 18–22 are then combined by synthesis filter 61 to provide the time-domain output signal that is sent on the communication link.

The manner in which the individual filters are constructed is explained in detail in U.S. Pat. No. 5,408,580, and hence will not be discussed in detail here. For the purposes of the present discussion, it is sufficient to note that the filters may be implemented as finite impulse response filters with real filter coefficients. If the synthesis filter generates M coefficients per frame representing the amplitude of the transmitted signal, the filter bank accepts M frequency-domain symbols and generates M time-domain coefficients. However, it should be noted that the M coefficients generated may also depend on symbols received prior to the M frequency-domain symbols of the current frame. Similarly, the analysis filter bank demodulates M frequency-domain symbols from M time-domain received signal values in a given frame, and the resulting M symbols may depend on previous frames of M time-domain signal values processed by the filter bank.

Figure 4:
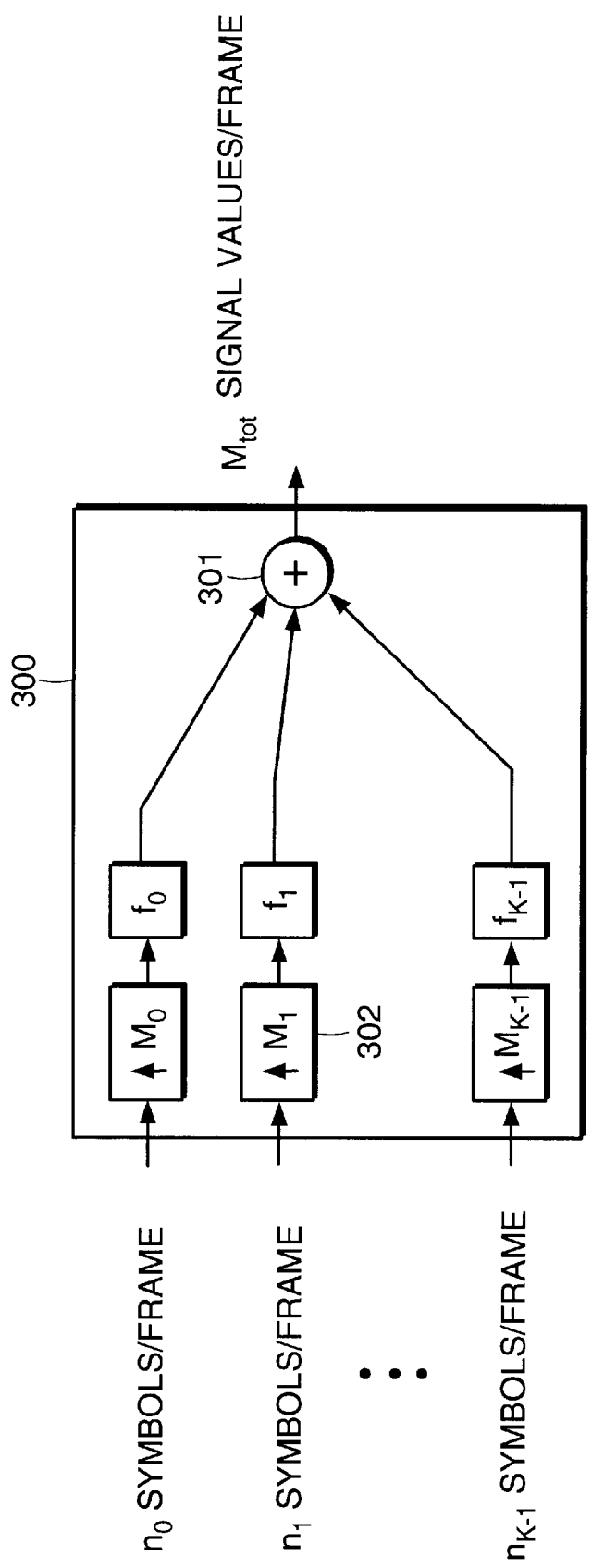
FIG. 4 is a schematic view of a second embodiment of a synthesis filter bank that may be used with the present invention to generate a frequency-domain to time-domain transformation.

The communication bandwidth may alternatively be broken up into subbands of distinct (nonuniform) bandwidths by means of a single nonuniform filter bank transform. The synthesis filter bank, or frequency-domain-to-time-domain transform for converting symbols into signal values for transmission, is depicted in FIG. 4 at 300 for a system having K subchannels. If the subchannels are nonuniform in their bandwidth, distinct subchannels of the filter bank will operate at different upsampling rates, the upsampling rate of the $k^{th}$ subchannel will be denoted by $M_k$. The upsampling rates are subject to the critical sampling condition $$\sum_{k=0}^{K-1} \frac{1}{M_k} = 1 \tag{1}$$

Referring to FIG. 4, synthesis filter bank 300 generates $M_{tot}$ time-domain samples in each time frame. Here, $M_{tot}$ is the least common multiple of the upsampling rates $M_k$ provided by the upsamplers of which 302 is typical. Define the integers $n_k$ by $$n_k = \frac{M_{tot}}{M_k}. \tag{2}$$

In each frame of transform processing, $n_k$ symbols, denoted by $s_{k,i}$, are mapped onto the $k^{th}$ subchannel using the sequence, $f_k$, as the modulating waveform to generate a time domain sequence, $x_k$, representing the symbols in the $k^{th}$ subchannel, i.e., $$x_k[n] = \sum_i s_{k,i} f_k[n - iM_k] \tag{3}$$

Note that symbols from previous frames may contribute to the output of a given frame. Each of the contributions $x_k$ from the K distinct subchannels are added together, as shown at 301, to produce a set of $M_{tot}$ time-domain signal values x[n] from $M_{tot}$ input symbols $S_{k,i}$ during the given frame. The $k^{th}$ subchannel will have a bandwidth that is $1/M_k$ as large as that occupied by the full transmitted signal.

At the receiver, the incoming discrete signal values x'[n] are passed through an analysis filter bank 400, depicted in FIG. 5. The received signal values are denoted by x' to emphasize that the samples have been altered by the transmission link. Each filter in this bank has a characteristic downsampling ratio $M_k$ imposed after filtering by an finite impulse response filter, producing a set of $M_{tot}$ output symbols s per frame. A typical filter is shown at 401 with its corresponding downsampler at 402. The output symbol stream for the $k^{th}$ subchannel is given by $$s'_{k,n} = \sum_i x'[i - nM_k] * H_k[i] \tag{4}$$

Again, input signal values from preceding frames may contribute to the set of symbols output during a given frame.

We require that in an ideal channel, the subchannel waveforms, $f_k$, together with the receive filters $H_k$ satisfy perfect-reconstruction or near-perfect-reconstruction conditions, with an output symbol stream that is identical (except for a possible delay of an integer number of samples) to the input symbol stream. This is equivalent to the absence of inter-symbol and inter-channel interference upon reconstruction. Methods for the design of such finite-impulse-response filter bank waveforms are known to the art. The reader is referred to J. Li, T. Q. Nguyen, S. Tantaratana, "A simple design method for nonuniform multirate filter banks," in *Proc. Asilomar Conf. On Signals, Systems, and Computers*, November 1994 for a detailed discussion of such filter banks.

Various modifications to the present invention will become apparent to those skilled in the art from the foregoing description and accompanying drawings. Accordingly, the present invention is to be limited solely by the scope of the following claims.

What is claimed is:

1. A communication system for sending a sequence of symbols on a communication link a sequence of symbols having values representative of said symbols, said communication system comprising a transmitter for placing information indicative of said sequence of symbols on said communication link and a receiver for receiving said information placed on said communication link by said transmitter, said transmitter comprising a clock for defining successive frames, each said frame comprising M time intervals, where M is an integer greater than 1;

a modulator modulating each of M carrier signals with a signal related to the value of one of said symbols thereby generating a modulated carrier signal corresponding to each of said carrier signals that is to be modulated and generating a sum signal comprising a sum of said modulated carrier signals, said modulator comprising a tree-structured array of filter banks having nodes, including a root node and M leaf nodes, each of said values related to said symbols forming an input to a corresponding one of said leaf nodes, each of said nodes, other than said leaf nodes, comprising one of said filter banks; and an output circuit for transmitting said sum signal on said communication link, wherein said carrier signals comprise first and second carriers, said first carrier having a different bandwidth than said second carrier.

2. The communication system of claim 1 wherein said receiver comprises:

an input circuit for receiving and storing M time-domain samples transmitted on said communication link; and a decoder for recovering said M symbol values, said decoder comprising a tree-structured array of sub-band filter banks, said received M time-domain samples forming the input of a root node of said tree-structured array of said decoder and said M symbol values being generated by the leaf nodes of said tree-structured array of said decoder, each said sub-band filter bank comprising a plurality of FIR filters having a common input for receiving an input time-domain signal, each said filter generating an output signal representing a symbol value in a corresponding frequency band.

3. A communication system for sending a sequence of symbols on a communication link, said communication system comprising a transmitter for placing information indicative of said sequence of symbols on said communication link, said transmitter comprising:

a clock for defining successive frames, each said frame comprising M time intervals, where M is an integer greater than 1;

a modulator modulating each of M carrier signals with a signal related to the value of one of said symbols thereby generating a modulated carrier signal corresponding to each of said carrier signals that is to be modulated and generating a sum signal comprising a sum of said modulated carrier signals;

an output circuit transmitting said sum signal on said communication link, wherein said carrier signals comprise first and second carriers, said first carrier having a different bandwidth than said second carrier; and a receiver comprising:

an input circuit for receiving and storing M time-domain samples transmitted on said communication link; and a decoder for recovering said M symbol values, said decoder comprising a tree-structured array of sub-band filter banks, said received M time-domain samples forming the input of a root node of said tree-structured array said decoder and said M symbol values being generated by the leaf nodes of said tree-structured array decoder, each said sub-band filter bank comprising a plurality of FIR filters having a common input for receiving an input time-domain signal, each said filter generating an output signal representing a symbol value in a corresponding frequency band.

4. The communication system of claim 3 wherein said modulator comprises a tree-structured array of filter banks having nodes, including a root node and M leaf nodes, each of said values related to said symbols forming an input to a corresponding one of said leaf nodes, each of said nodes, other than said leaf nodes, comprising one of said filter banks.

* * * * *